H. L. MENNERICH.
Horse-Collar.
No. 207,194. Patented Aug. 20, 18__.
Fig. 1
Fig. 2
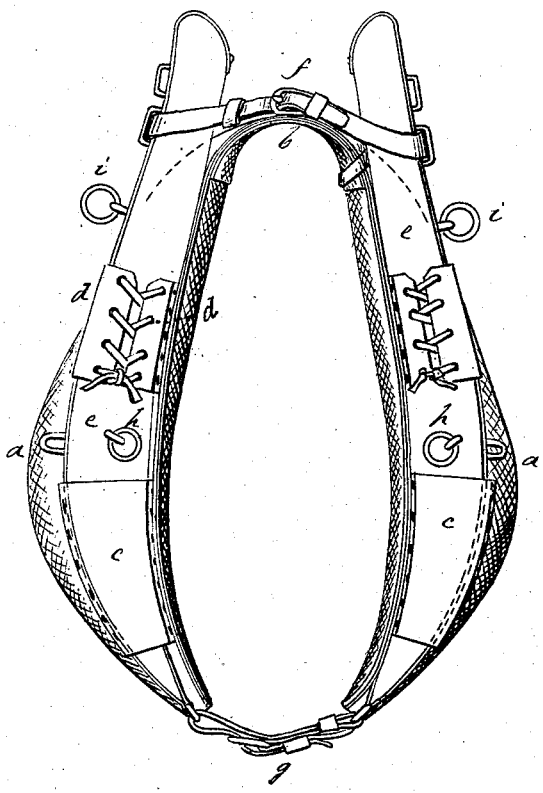
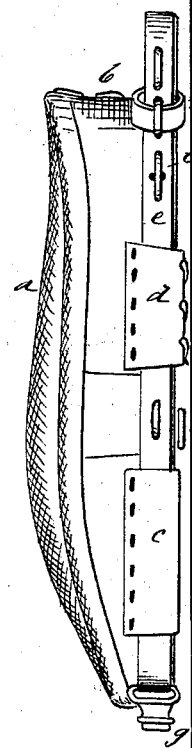
WITNESSES:
C. Neveux
C. Sedgwick
INVENTOR:
H. L. Mennerich
BY
ATTORNEYS.

UNITED STATES PATENT OFFICE.

HENRY L. MENNERICH, OF SIOUX CITY, IOWA.

IMPROVEMENT IN HORSE-COLLARS.

Specification forming part of Letters Patent No. 207,194, dated August 20, 1878; application filed July 26, 1878.

*To all whom it may concern:*

Be it known that I, HENRY L. MENNERICH, of Sioux City, in the county of Woodbury and State of Iowa, have invented a new and Improved Horse-Collar, of which the following is a specification:

The object of my invention is to furnish a cheap and durable collar for horses, and one which will permit ready adjustment of the hames and collar.

My invention consists in a horse-collar having loops for attachment of the hames, whereby the usual hame-rim on the collar is dispensed with, and the hames may be adjusted.

The collar is formed in two parts, buckled together at the top, and when on the horse it is held together at the bottom and in place by the hame-strap.

The collar and hames need not be separated for removal from a horse, but may remain connected together.

In the drawing, Figure 1 is a front elevation of my improved horse-collar with hames attached thereto, and Fig. 2 is a side view of the same.

Similar letters of reference indicate corresponding parts.

The collar $a$ is formed of the usual shape, so that it will fit upon a horse's shoulder when put together. Instead of being connected together at the lower ends, as usual, the collar is open at the bottom, and the two parts are attached together at the top by a buckle and cap, as seen at $b$.

The seam at the front of the collar, where the hame-rim is usually fastened, is upon the upper side, to prevent the edge chafing the horse's neck, and the hame-rim is dispensed with.

$c\ c$ are closed loops, sewed or riveted to the front of the collar near the bottom thereof, and $d\ d$ are loops or flaps attached on each side of collar $a$, near the upper end. The flaps $d$ are provided with eyelets or holes to permit them to be laced together over the hames after they are put on the collar.

The hames $e$ are of usual character, having a strap, $f$, and buckle for connecting their upper ends, and strap $g$ and buckle at their lower ends.

In applying the hames to the collar, the lower ends of the former are passed through loops $c$, which loops will come below the breast-ring $h$. The flaps $d$ are then laced together over the hames, and they come between the breast-ring $h$ and line-ring $i$ at each side.

The collar $a$ may be put upon or taken off with the hames in the position described. The strap $g$ secures the collar in place, and by shortening or lengthening $g$ the collar is adjusted to suit the shape of the horse's neck.

By the construction described the collar can be made cheaper than any heretofore used, and it is very durable. The collar and hames are also handy for use and save time in harnessing a horse.

Having thus described my invention, I claim as new and desire to secure by Letters Patent—

A horse-collar provided with loops $c$ and flaps $d$, the latter adapted to be laced together for the attachment of the hames, substantially as described.

HENRY L. MENNERICH.

Witnesses:
   CHAS. BREÜN,
   FREDERICK SINGER.